US010877691B2

(12) United States Patent
Barczak et al.

(10) Patent No.: US 10,877,691 B2
(45) Date of Patent: Dec. 29, 2020

(54) STREAM CLASSIFICATION BASED ON LOGICAL REGIONS (71) Applicant: Intel Corporation, Santa Clara, CA (US)

(72) Inventors: Mariusz Barczak, Gdansk (PL); Dhruvil Shah, Chandler, AZ (US); Kapil Karkra, Chandler, AZ (US); Andrzej Jakowski, Chandler, AZ (US); Piotr Wysocki, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/858,067

(22) Filed: Dec. 29, 2017

(65) Prior Publication Data

US 2019/0034120 A1 Jan. 31, 2019

(51) Int. Cl.
*G06F 12/00* (2006.01)
*G06F 3/06* (2006.01)
*G06F 13/16* (2006.01)
*G06F 12/10* (2016.01)

(52) U.S. Cl.
CPC ............ *G06F 3/0659* (2013.01); *G06F 3/061* (2013.01); *G06F 3/0604* (2013.01); *G06F 3/0611* (2013.01); *G06F 3/0613* (2013.01); *G06F 3/0616* (2013.01); *G06F 3/0635* (2013.01); *G06F 3/0644* (2013.01); *G06F 3/0679* (2013.01); *G06F 3/0688* (2013.01); *G06F 13/1642* (2013.01); *G06F 12/10* (2013.01); *G06F 2212/1044* (2013.01); *G06F 2212/202* (2013.01); *G06F 2212/657* (2013.01)

(58) Field of Classification Search
CPC .. G06F 17/30516; G06F 3/061; G06F 9/4881; G06F 17/30339; G06F 2201/88; G06F 2212/7211; G06F 3/0653; G06F 3/0659; G06F 13/1642; G06F 3/0688; G06F 3/0635; G06F 3/0616; G06F 3/0679; G06F 3/0613; G06F 3/0611; G06F 3/0604; G06F 3/0644; G06F 2212/657; G06F 2212/1044; G06F 12/10; G06F 2212/202; G06F 12/0246; G06F 3/064; G06F 16/1724; G06F 2206/1004
See application file for complete search history.

(56) References Cited

U.S. PATENT DOCUMENTS 6,671,747 B1 *  12/2003  Benkual .............. G06F 9/30043
                                                          710/1
8,625,224 B1 *   1/2014  Lin ........................ G11B 5/012
                                                          360/18
(Continued)

OTHER PUBLICATIONS

NVM Express, "NVM Express", May 1, 2017, 282 pages, Revision 1.3.

(Continued)

*Primary Examiner* — Prasith Thammavong
(74) *Attorney, Agent, or Firm* — Jordan IP Law, LLC (57) ABSTRACT An embodiment of a semiconductor package apparatus may include technology to determine a stream classification for an access request to a persistent storage media, and assign the access request to a stream based on the stream classification. Other embodiments are disclosed and claimed.

20 Claims, 4 Drawing Sheets

(56) References Cited

U.S. PATENT DOCUMENTS

| | | | | |
|---|---|---|---|---|
| 8,893,146 | B2* | 11/2014 | Muppirala | G06F 3/0611 709/224 |
| 9,378,136 | B1* | 6/2016 | Martin | G06F 12/0246 |
| 9,804,951 | B2* | 10/2017 | Liu | G06F 11/3644 |
| 9,990,146 | B2* | 6/2018 | Neelakanta | G06F 3/0616 |
| 10,089,145 | B1* | 10/2018 | Priescu | G06F 3/067 |
| 10,101,942 | B1* | 10/2018 | Parker | G06F 12/0246 |
| 2003/0145038 | A1* | 7/2003 | Bin Tariq | H04L 67/2852 709/202 |
| 2007/0094491 | A1* | 4/2007 | Teo | H04L 63/1408 713/153 |
| 2010/0185827 | A1* | 7/2010 | Lowery | G06F 3/0608 711/165 |
| 2011/0161723 | A1* | 6/2011 | Taleck | G06F 16/1748 714/4.11 |
| 2011/0225164 | A1* | 9/2011 | Narasayya | G06F 17/30336 707/741 |
| 2011/0231610 | A1* | 9/2011 | Yano | G06F 12/0246 711/118 |
| 2012/0005415 | A1* | 1/2012 | Jung | G06F 12/0246 711/103 |
| 2012/0023222 | A1* | 1/2012 | Campion | G06F 9/5072 709/224 |
| 2012/0324196 | A1* | 12/2012 | Maillet | G06F 9/5016 711/170 |
| 2013/0138867 | A1* | 5/2013 | Craft | G06F 12/0246 711/103 |
| 2013/0152097 | A1* | 6/2013 | Boctor | G06F 9/505 718/103 |
| 2014/0164612 | A1* | 6/2014 | Hillier | H04L 41/0896 709/224 |
| 2015/0227316 | A1* | 8/2015 | Warfield | G06F 3/0611 711/103 |
| 2016/0179488 | A1* | 6/2016 | Raman | G06F 8/443 717/158 |
| 2016/0234348 | A1* | 8/2016 | Mao | H04L 69/08 |
| 2016/0283116 | A1 | 9/2016 | Ramalingam | |
| 2016/0283394 | A1* | 9/2016 | Chahal | G06F 3/0604 |
| 2017/0054982 | A1* | 2/2017 | Vellore Arumugam | H04N 19/17 |
| 2017/0075832 | A1* | 3/2017 | Bhimani | G06F 3/0653 |
| 2017/0131934 | A1* | 5/2017 | Kaczmarczyk | G06F 3/0644 |
| 2017/0220623 | A1* | 8/2017 | Blount | G06F 12/0269 |
| 2017/0228157 | A1* | 8/2017 | Yang | G06F 13/18 |
| 2017/0228188 | A1 | 8/2017 | Hassani et al. | |
| 2017/0242583 | A1* | 8/2017 | Yang | G06F 3/061 |
| 2017/0255556 | A1* | 9/2017 | Peng | G06F 12/126 |
| 2018/0018101 | A1* | 1/2018 | Benisty | G06F 3/0608 |
| 2018/0113642 | A1* | 4/2018 | Huen | G06F 3/0605 |
| 2018/0239548 | A1* | 8/2018 | Koo | G06F 11/3034 |
| 2018/0260154 | A1* | 9/2018 | Dronamraju | H04L 67/1097 |
| 2018/0276118 | A1* | 9/2018 | Yanagida | G06F 3/0688 |
| 2019/0056882 | A1* | 2/2019 | Feldman | G06F 3/0644 |
| 2019/0095116 | A1* | 3/2019 | Igahara | G06F 12/10 |
| 2019/0303038 | A1* | 10/2019 | Hubbard | G06F 3/0611 |
| 2020/0159443 | A1* | 5/2020 | Shanmugasundaram | G06F 3/0655 |
| 2020/0174695 | A1* | 6/2020 | Bazarsky | G06F 3/061 |
| 2020/0249839 | A1* | 8/2020 | Yang | G06F 3/061 |

OTHER PUBLICATIONS

European Search Report for European Patent Application No. 18209310.4 dated Apr. 5, 2019, 7 pages.

* cited by examiner

STREAM CLASSIFICATION BASED ON LOGICAL REGIONS

TECHNICAL FIELD

Embodiments generally relate to storage systems. More particularly, embodiments relate to stream classification based on logical regions.

BACKGROUND

The Non-Volatile Memory Express (NVMe) standard (e.g., NVMe Revision 1.3, published May 1, 2017) defines an interface that allows a host to communicate with a non-volatile memory (NVM) subsystem. The NVMe interface may be particularly useful for enterprise and client solid state drives (SSDs), which may be attached to the host as a register level interface to a Peripheral Component Interface (PCI) Express interface. NVMe may provide a streams directive which enables the host to indicate to the controller (e.g., with a stream identifier) that the specified logical blocks in a write command are part of one group of associated data. This information may be used by the controller to store related data in associated locations, or for other performance enhancements.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Various embodiments described herein may include a memory component and/or an interface to a memory component. Such memory components may include volatile and/or nonvolatile memory. Nonvolatile memory may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In particular embodiments, a memory component with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory may be a storage medium that requires power to maintain the state of data stored by the medium. Non-limiting examples of volatile memory may include various types of RAM, such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Figure 1:
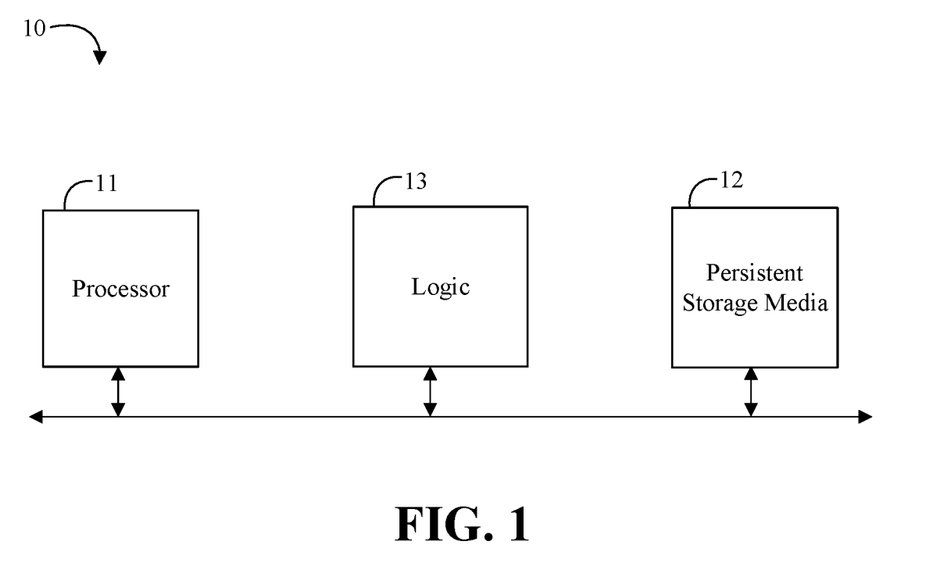
FIG. 1 is a block diagram of an example of an electronic processing system according to an embodiment.

Turning now to FIG. 1, an embodiment of an electronic processing system 10 may include a processor 11, persistent storage media 12 communicatively coupled to the processor 11, and logic 13 communicatively coupled to the processor 11 to determine a stream classification for an access request to the persistent storage media 12, and assign the access request to a stream based on the stream classification. In some embodiments, the logic 13 may be configured to determine the stream classification based on logical region information. For example, the logic 13 may be configured to determine the logical region information based on one or more of namespace information, address range information, and partition information. In some embodiments, the logic 13 may be further configured to separate a workload into different streams based on a workload characteristic including one or more of a data access pattern and an expected lifetime of the data. For example, the logic 13 may also be configured to create stream regions to defragment the persistent storage media 12 based on a workload analysis. In some embodiments, the persistent storage media 12 may include a SSD. In some embodiments, the logic 13 may be located in, or co-located with, various components, including the processor 11 (e.g., on a same die).

Embodiments of each of the above processor 11, persistent storage media 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C # or the like and conventional procedural programming languages, such as the "C" programming language or similar programming languages. For example, the persistent storage media 12 or other system memory may store a set of instructions which when executed by the processor 11 cause the system 10 to implement one or more components, features, or aspects of the system 10 (e.g., the logic 13, determining a stream classification for an access request to the persistent storage media, assigning the access request to a stream based on the stream classification, etc.).

Figure 2:
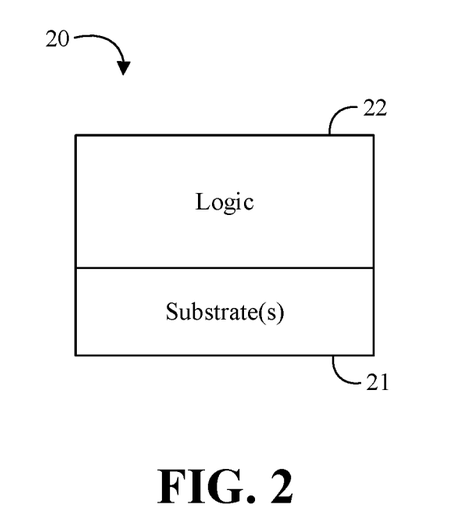
FIG. 2 is a block diagram of an example of a semiconductor package apparatus according to an embodiment.

Turning now to FIG. 2, an embodiment of a semiconductor package apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates may be configured to determine a stream classification for an access request to a persistent storage media, and assign the access request to a stream based on the stream classification. In some embodiments, the logic 22 may be configured to determine the stream classification based on logical region information. For example, the logic 22 may be configured to determine the logical region information based on one or more of namespace information, address range information, and partition information. In some embodiments, the logic 22 may be further configured to separate a workload into different streams based on a workload characteristic including one or more of a data access pattern and an expected lifetime of the data. For example, the logic 22 may also be configured to create stream regions to defragment the persistent storage media based on a workload analysis. In some embodiments, the persistent storage media may include a solid state drive (SSD). In some embodiments, the logic 22 coupled to the one or more substrates 21 may include transistor channel regions that are positioned within the one or more substrates.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

The apparatus 20 may implement one or more aspects of the method 30 (FIGS. 3A to 3C), or any of the embodiments discussed herein. The illustrated apparatus 20 includes one or more substrates 21 (e.g., silicon, sapphire, gallium arsenide) and logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
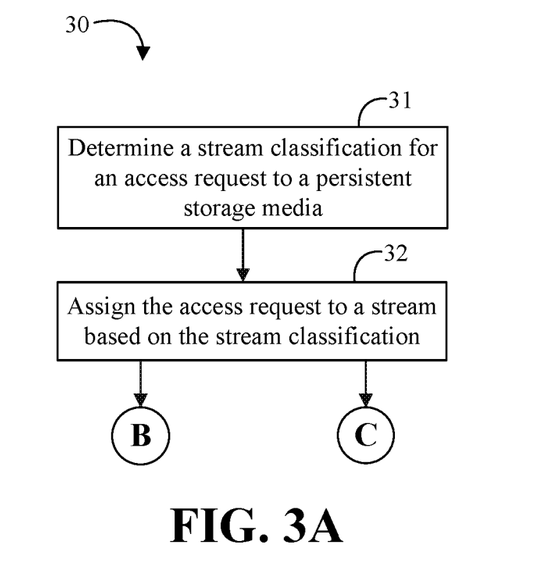
FIGS. 3A to 3C are flowcharts of an example of a method of controlling storage according to an embodiment.
Figure 3B:
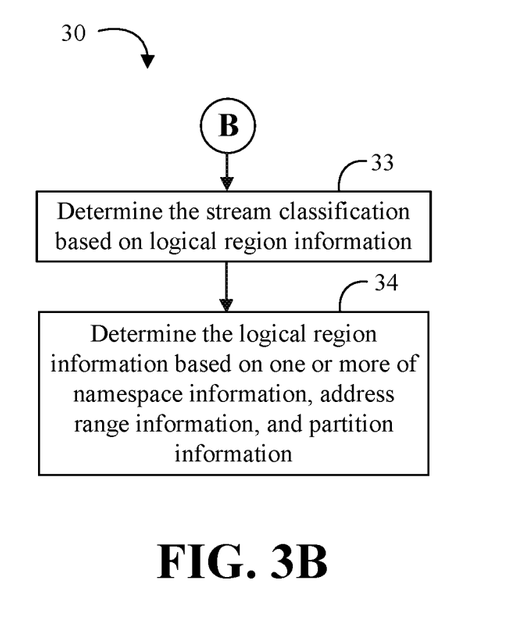
Figure 3C:
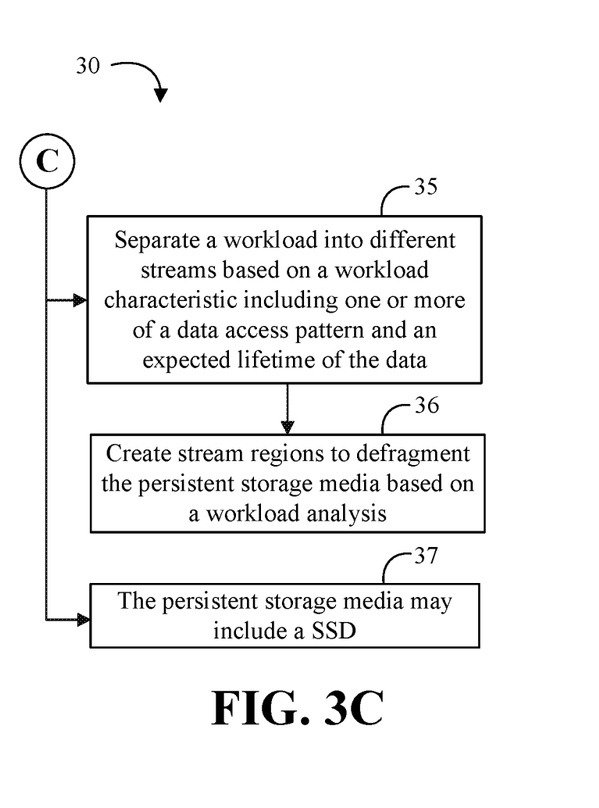

Turning now to FIGS. 3A to 3C, an embodiment of a method 30 of controlling storage may include determining a stream classification for an access request to a persistent storage media at block 31, and assigning the access request to a stream based on the stream classification at block 32. Some embodiments of the method 30 may include determining the stream classification based on logical region information at block 33. For example, the method 30 may include determining the logical region information based on one or more of namespace information, address range information, and partition information at block 34. Some embodiments of the method 30 may further include separating a workload into different streams based on a workload characteristic including one or more of a data access pattern and an expected lifetime of the data at block 35. For example, the method 30 may also include creating stream regions to defragment the persistent storage media based on a workload analysis at block 36. In some embodiments, the persistent storage media may include a SSD at block 37.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

For example, the method 30 may be implemented on a computer readable medium as described in connection with Examples 19 to 24 below. Embodiments or portions of the method 30 may be implemented in firmware, applications (e.g., through an application programming interface (API)), or driver software running on an operating system (OS).

Figure 4:
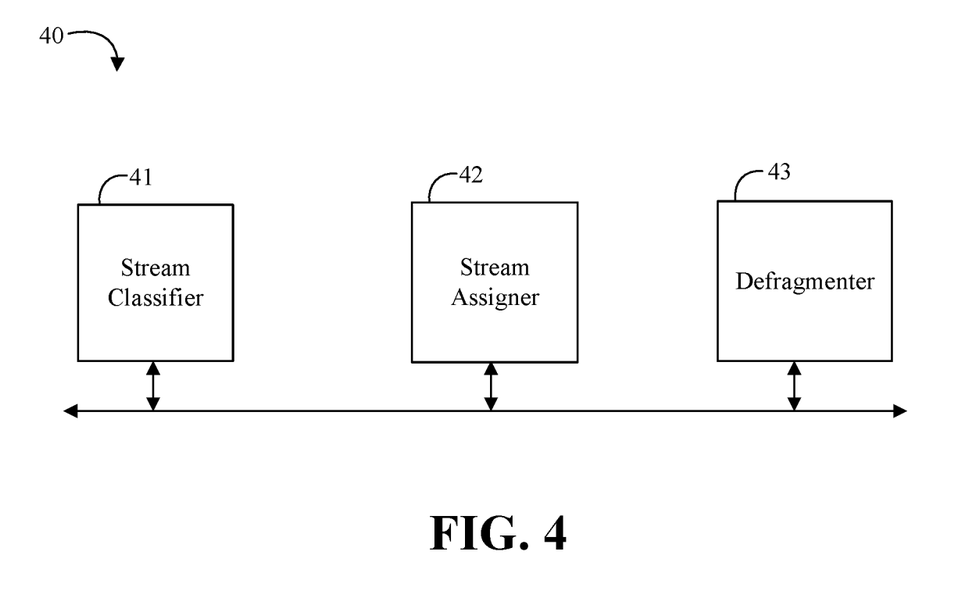
FIG. 4 is a block diagram of an example of storage controller apparatus according to an embodiment.

Turning now to FIG. 4, an embodiment of a storage controller 40 may include a stream classifier 41, a stream assigner 42, and a defragmenter 43. The stream classifier 41 may include technology to determine a stream classification for an access request to a persistent storage media. The stream assigner 42 may include technology to assign the access request to a stream based on the stream classification. In some embodiments, the stream classifier 41 may be configured to determine the stream classification based on logical region information. For example, stream classifier 41 may be configured to determine the logical region information based on one or more of namespace information, address range information, and partition information. In some embodiments, the stream assigner 42 may be further configured to separate a workload into different streams based on a workload characteristic including one or more of a data access pattern and an expected lifetime of the data. For example, the defragmenter 43 may be configured to create stream regions to defragment the persistent storage media based on a workload analysis. In some embodiments, the persistent storage media may include a solid state drive (SSD).

Embodiments of the stream classifier 41, the stream assigner 42, the defragmenter 43, and other components of the storage controller 40, may be implemented in hardware, software, or any combination. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

Some embodiments may advantageously provide NVMe/SSD stream classification by logical partition regions. For example, some embodiments may be implemented in host software storage drivers that control access to NAND-based SSDs. Some embodiments may be particularly useful for SSDs that include stream technology that enables the host to control data placement on the physical medium (e.g., such as the NVMe streams directive).

Some NAND-based storage media may have an erase-before-write requirement which means that the SSD cannot overwrite a given LBA directly. Instead, the SSD may erase data only in large units called erase units and the whole erase unit may need to be erased at once. Accordingly, when a host performs write operations in smaller units, the SSD may need to write data into a new physical location and mark the old location as invalid. At some later time, an additional background operation may be needed to move data from fragmented erase units into another physical location making those erase units available for erase. Some systems may refer to this operation as garbage collection or defragmentation (e.g., "defrag"). Garbage collection may increase a write amplification factor (WAF) because the number of writes to the medium may become higher than the number of writes issued by the host. Because an increased WAF may have negative impact on endurance, performance, and/or quality of service (QoS), some embodiments may provide a host application that issues writes in a manner that helps SSD reduce number of additional writes.

Stream technology may allow a host to classify data into separate streams. The data from different streams may be placed on separate erase units. By grouping data with similar life time together, for example, the host may reduce or minimize the amount of garbage collection work and in consequence may also reduce or minimize the WAF. When a SDD is utilized by several applications, the SSD may be divided into logical regions (e.g., partitions). Each application may work on top of an assigned partition and may generate different workloads in terms of velocity, random vs. sequential, block time overwritten (e.g., hotness), etc. In some other systems, on a host software driver level, the workloads may be mixed when accessing the storage subsystem and classification information may be lost. Some embodiments may utilize stream technology to separate logical regions, advantageously reducing or minimizing the WAF of a storage subsystem which includes a SSD. Because each application may generate different workloads, some embodiments may also utilize stream technology to place different workloads on separate erase units to reduce or minimize fragmentation (e.g., based on the workload characteristics). Some host-based implementations may reduce or minimize both WAF and fragmentation which may provide additional benefits such improved endurance, performance, and/or QoS. Some embodiments may also advantageously provide power savings due to reduced or minimized garbage collection logic in the host and/or the SSD (e.g., some garbage collection logic may not need to be duplicated on both sides).

Some embodiments may provide namespace identifier (ID) based classification. A presented workload may require a large SSD be broken down into multiple small physical units of capacity. For some SSDs, a namespace may provide only logical partitioning. Physically, some other SSDs may interleave host writes to multiple namespaces and may place data on actual physical bands based on temporal order. Advantageously, some embodiments may utilize stream technology (e.g., with a NVMe streams directive capable SSD) to tag storage access input/output (IO) with the namespace ID (NSID) such that the SSD may physically separate data destined for one namespace from other namespaces. For example, the upper layer storage driver may identify different lifetime data to store on different namespaces.

In some embodiments, a streams library (e.g., a software component which may contain various stream classifiers and which may be utilized by various other components including, for example, applications, file systems, host storage drivers, etc.) may provide namespace ID-based classification to provide a way for applications to separate IO into streams. For example, the library may perform vendor specific commands to enable namespace ID-based stream classification at an NVMe driver side. Once enabled, the NVMe driver may tag each write IO with a stream ID corresponding to the NSID of the namespace to which the IO belongs. In some embodiments, the stream library may be an independent kernel driver. For example, the stream library may be utilized by a host storage software driver (e.g., an NVMe driver on WINDOWS, LINUX, etc.), or other applications.

Alternatively, or additionally, some embodiments may provide logical block address (LBA) range and/or partition based stream classification. For example, in some embodiments, software partitions may be an alternative to namespaces. At the lower levels in the OS stack (e.g., at the NVMe driver level), some other systems may not be able to determine how to map an LBA to partition. Some embodiments may advantageously provide a mapping between LBAs and partitions in order to assign an appropriate stream ID to a write IO. For example, the mapping may be implemented by the streams library. If a partition scheme is available to the streams library, LBA to partition mapping may be based on the available partition scheme. In LINUX, for example, kernel partitioning information may available and some embodiments may build a physical LBA to partition ID map based on the kernel partitioning information. Alternatively, or additionally, an OS/driver/firmware/application/etc. may create LBA ranges and assign a stream id for the created LBA ranges. For example, the LBA ranges may correspond to logical partition ranges and the streams library may tag the write IOs with a stream ID equal to the partition ID according to a pre-configured map of LBA range to partition ID.

Preferably, the OS/driver/firmware/application/etc. determines workload characteristics such as lifetime data, access pattern, etc. and assigns workloads having different characteristics to different logical partitions and/or different LBA ranges. For example, some file systems may have a journal that maintains the LBA ranges. Caching, RAID, and other applications at the block layer may use a similar journal. CESH-based storage systems may also create a partition to store a CEPH journal. In these and other examples, the application may determine the LBA range and can pre-configure a map for the streams library (e.g., to map unique partition IDs to the LBA ranges for different journals) to separate one partition from other partitions.

Figure 5:
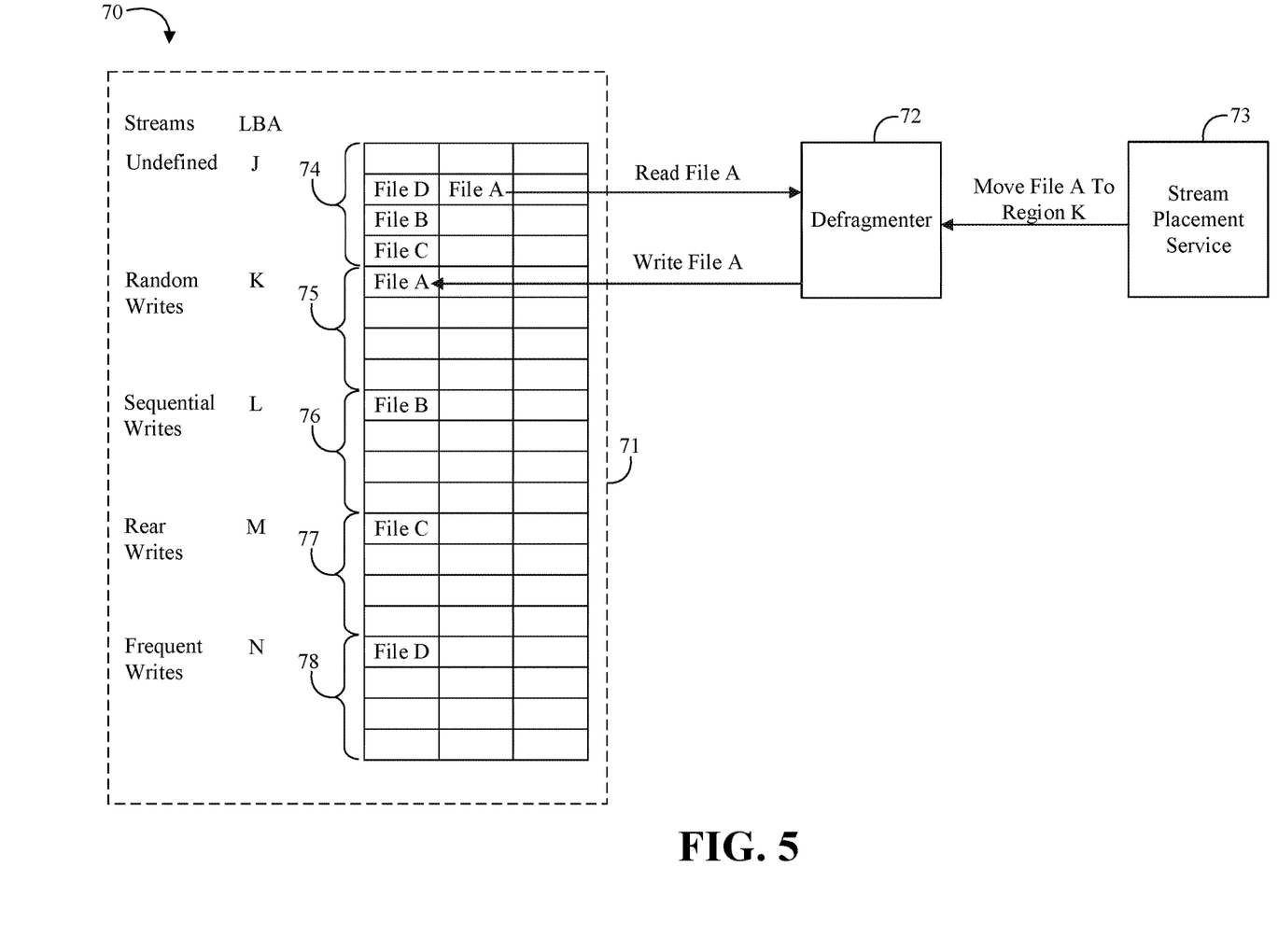
FIG. 5 is a block diagram of another example of an electronic processing system according to an embodiment.

Turning now to FIG. 5, an electronic processing system 70 may include a filesystem 71 communicatively coupled to a defragmenter 72. The defragmenter 72 may also be communicatively coupled to a stream placement service 73. Some embodiments of the system 70 may provide a service for defragmenting files into LBA stream regions on a namespace. For example, the stream placement service 73 may run for the filesystem 71. The service 73 may be run in user space, implemented in the filesystem 71, or may be a part of an OS storage stack. The service 73 may collect metrics and/or access patterns for files located on the filesystem 71. Depending on workloads, by using NVMe administration commands, the service 73 may be able to create LBA regions on the namespace with static assignment of a stream ID for each region. Whenever a NVMe driver receives write IO for the specific region, it will be handled by assigned stream logic. For example, the service 73 may create a stream LBA region on a namespace which corresponds to files which are frequently overwritten or invalidated, files which are rarely modified, files where the write IO access pattern is random, files where the write IO access pattern is sequential, and so on.

For example, the service 73 may instruct the defragmenter 72 to create logical region 74 for undefined streams (with LBA range J), logical region 75 for random writes (with LBA range K), logical region 76 for sequential writes (with LBA range L), logical region 77 for rear writes (with LBA range M), logical region 78 for frequent writes (with LBA range N), and so on. After the LBA regions have been created, the service 73 may instruct the filesystem/OS to defrag particular files into corresponding LBA regions. In some embodiments, after a workload analysis over some period of time the service 73 may decide to group (e.g., move) files into corresponding regions (e.g., based on the predominant access patterns for the files). For example, file A may be moved into the random writes region 75, file B may be moved into the sequential writes region 76, file C may be moved into the rear writes region 77, filed D may be moved into the frequent writes region 78, and so on.

ADDITIONAL NOTES AND EXAMPLES

Example 1 may include an electronic processing system, comprising a processor, persistent storage media communicatively coupled to the processor, and logic communicatively coupled to the processor to determine a stream classification for an access request to the persistent storage media, and assign the access request to a stream based on the stream classification.

Example 2 may include the system of Example 1, wherein the logic is further to determine the stream classification based on logical region information.

Example 3 may include the system of Example 2, wherein the logic is further to determine the logical region information based on one or more of namespace information, address range information, and partition information.

Example 4 may include the system of Example 1, wherein the logic is further to separate a workload into different streams based on a workload characteristic including one or more of a data access pattern and an expected lifetime of the data.

Example 5 may include the system of Example 4, wherein the logic is further to create stream regions to defragment the persistent storage media based on a workload analysis.

Example 6 may include the system of any of Examples 1 to 5, wherein the persistent storage media comprises a solid state drive.

Example 7 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to determine a stream classification for an access request to a persistent storage media, and assign the access request to a stream based on the stream classification.

Example 8 may include the apparatus of Example 7, wherein the logic is further to determine the stream classification based on logical region information.

Example 9 may include the apparatus of Example 8, wherein the logic is further to determine the logical region information based on one or more of namespace information, address range information, and partition information.

Example 10 may include the apparatus of Example 7, wherein the logic is further to separate a workload into different streams based on a workload characteristic including one or more of a data access pattern and an expected lifetime of the data.

Example 11 may include the apparatus of Example 10, wherein the logic is further to create stream regions to defragment the persistent storage media based on a workload analysis.

Example 12 may include the apparatus of any of Examples 7 to 11, wherein the persistent storage media comprises a solid state drive.

Example 13 may include a method of controlling storage, comprising determining a stream classification for an access request to a persistent storage media, and assigning the access request to a stream based on the stream classification.

Example 14 may include the method of Example 13, further comprising determining the stream classification based on logical region information.

Example 15 may include the method of Example 14, further comprising determining the logical region information based on one or more of namespace information, address range information, and partition information.

Example 16 may include the method of Example 13, further comprising separating a workload into different streams based on a workload characteristic including one or more of a data access pattern and an expected lifetime of the data.

Example 17 may include the method of Example 16, further comprising creating stream regions to defragment the persistent storage media based on a workload analysis.

Example 18 may include the method of any of Examples 13 to 17, wherein the persistent storage media comprises a solid state drive.

Example 19 may include at least one computer readable medium, comprising a set of instructions, which when executed by a computing device, cause the computing device to determine a stream classification for an access request to a persistent storage media, and assign the access request to a stream based on the stream classification.

Example 20 may include the at least one computer readable medium of Example 19, comprising a further set of instructions, which when executed by the computing device, cause the computing device to determine the stream classification based on logical region information.

Example 21 may include the at least one computer readable medium of Example 20, comprising a further set of instructions, which when executed by the computing device, cause the computing device to determine the logical region information based on one or more of namespace information, address range information, and partition information.

Example 22 may include the at least one computer readable medium of Example 19, comprising a further set of instructions, which when executed by the computing device, cause the computing device to separate a workload into different streams based on a workload characteristic including one or more of a data access pattern and an expected lifetime of the data.

Example 23 may include the at least one computer readable medium of Example 22, comprising a further set of instructions, which when executed by the computing device, cause the computing device to create stream regions to defragment the persistent storage media based on a workload analysis.

Example 24 may include the at least one computer readable medium of any of Examples 19 to 23, wherein the persistent storage media comprises a solid state drive.

Example 25 may include a storage controller apparatus, comprising means for determining a stream classification for an access request to a persistent storage media, and means for assigning the access request to a stream based on the stream classification.

Example 26 may include the apparatus of Example 25, further comprising means for determining the stream classification based on logical region information.

Example 27 may include the apparatus of Example 26, further comprising means for determining the logical region information based on one or more of namespace information, address range information, and partition information.

Example 28 may include the apparatus of Example 25, further comprising means for separating a workload into different streams based on a workload characteristic including one or more of a data access pattern and an expected lifetime of the data.

Example 29 may include the apparatus of Example 28, further comprising means for creating stream regions to defragment the persistent storage media based on a workload analysis.

Example 30 may include the apparatus of any of Examples 25 to 29, wherein the persistent storage media comprises a solid state drive.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
a processor;
persistent storage media communicatively coupled to the processor; and
logic communicatively coupled to the processor to:
determine workload characteristics,
create streams based on the workload characteristics,
tag an access request with a stream ID to assign the access request to a stream based on a workload characteristic of the access request, wherein the stream ID is to correspond to a logical region ID of a logical region of the persistent storage media, wherein a first stream ID is associated with one or more first logical regions designated to have a sequential access pattern and a second stream ID is associated with one or more second logical regions designated to have a non-sequential access pattern, wherein a third stream ID is associated with one or more third logical regions designated to have overwrites and a fourth stream ID is associated with one or more fourth logical regions designated to have overwrites at a lesser frequency than the one or more third logical regions, wherein the first, second, third, and fourth first stream IDs and logical regions comprise four different individual stream IDs respectively associated with four different individual logical regions, and
separate the access request from one or more other access requests to the stream based on the stream ID.

2. The system of claim 1, wherein the logical region information includes one or more of namespace information, address range information, and partition information.

3. The system of claim 1, wherein the workload characteristic includes one or more of a data access pattern and an expected lifetime of the data.

4. The system of claim 1, wherein the logic is further to:
defragment data stored in the persistent storage media based on access patterns for the data.

5. The system of claim 1, wherein the persistent storage media comprises a solid state drive.

6. A semiconductor package apparatus, comprising:
one or more substrates; and
logic coupled to the one or more substrates, wherein the logic is at least partly implemented in one or more of configurable logic and fixed-functionality hardware logic, the logic coupled to the one or more substrates to:
determine workload characteristics,
create streams based on the workload characteristics,
tag an access request with a stream ID to assign the access request to a stream based on a workload characteristic of the access request, wherein the stream ID is to correspond to a logical region ID of a logical region of the persistent storage media, wherein a first stream ID is associated with one or more first logical regions designated to have a sequential access pattern and a second stream ID is associated with one or more second logical regions designated to have a non-sequential access pattern, wherein a third stream ID is associated with one or more third logical regions designated to have overwrites and a fourth stream ID is associated with one or more fourth logical regions designated to have overwrites at a lesser frequency than the one or more third logical regions, wherein the first, second, third, and fourth first stream IDs and logical regions comprise four different individual stream IDs respectively associated with four different individual logical regions, and
separate the access request from one or more other access requests to the stream based on the stream ID.

7. The apparatus of claim 6, wherein the logical region information includes one or more of namespace information, address range information, and partition information.

8. The apparatus of claim 6, wherein the workload characteristic includes one or more of a data access pattern and an expected lifetime of the data.

9. The apparatus of claim 6, wherein the logic is further to:
defragment data stored in the persistent storage media based on an access patterns for the data.

10. The apparatus of claim 6, wherein the persistent storage media comprises a solid state drive.

11. A method of controlling storage, comprising:
determining workload characteristics;
creating streams based on the workload characteristics;
tagging an access request with a stream ID to assign the access request to a stream based on a workload characteristic of the access request, wherein the stream ID corresponds to a logical region ID of a logical region of the persistent storage media, wherein a first stream ID is associated with one or more first logical regions designated to have a sequential access pattern and a second stream ID is associated with one or more second logical regions designated to have a non-sequential access pattern, wherein a third stream ID is associated with one or more third logical regions designated to have overwrites and a fourth stream ID is associated with one or more fourth logical regions designated to have overwrites at a lesser frequency than the one or more third logical regions, wherein the first, second, third, and fourth first stream IDs and logical regions comprise four different individual stream IDs respectively associated with four different individual logical regions; and
separating the access request from one or more other access requests to the stream based on the stream ID.

12. The method of claim 11, wherein the logical region information includes one or more of namespace information, address range information, and partition information.

13. The method of claim 11, wherein the workload characteristic includes one or more of a data access pattern and an expected lifetime of the data.

14. The method of claim 11, further comprising:
defragmenting data stored in the persistent storage media based on access patterns for the data.

15. The method of claim 11, wherein the persistent storage media comprises a solid state drive.

16. At least one non-transitory computer readable medium, comprising a set of instructions, which when executed by a computing device, cause the computing device to:
determine workload characteristics;
create streams based on the workload characteristics;
tag an access request with a stream ID to assign the access request to a stream based on a workload characteristic of the access request, wherein the stream ID is to correspond to a logical region ID of a logical region of the persistent storage media, wherein a first stream ID is associated with one or more first logical regions designated to have a sequential access pattern and a second stream ID is associated with one or more second logical regions designated to have a non-sequential access pattern, wherein a third stream ID is associated with one or more third logical regions designated to have overwrites and a fourth stream ID is associated with one or more fourth logical regions designated to have overwrites at a lesser frequency than the one or more third logical regions, wherein the first, second, third, and fourth first stream IDs and logical regions comprise four different individual stream IDs respectively associated with four different individual logical regions; and separate the access request from one or more other access requests to the stream based on the stream ID.

17. The at least one non-transitory computer readable medium of claim 16, wherein the logical region information includes one or more of namespace information, address range information, and partition information.

18. The at least one non-transitory computer readable medium of claim 16, wherein the workload characteristic includes one or more of a data access pattern and an expected lifetime of the data.

19. The at least one non-transitory computer readable medium of claim 16, comprising a further set of instructions, which when executed by the computing device, cause the computing device to:

defragment data stored in the persistent storage media based on access patterns for the data.

20. The at least one non-transitory computer readable medium of claim 16, wherein the persistent storage media comprises a solid state drive.

* * * * *